United States Patent [19]

Hamann

[11] 3,865,502
[45] Feb. 11, 1975

[54] TOOL EXTENSION
[75] Inventor: Fred H. Hamann, Minneapolis, Minn.
[73] Assignee: The Raymond Lee Organization, Inc., New York, N.Y.
[22] Filed: Oct. 19, 1973
[21] Appl. No.: 407,975

[52] U.S. Cl.............. 408/226, 408/238, 403/290, 403/293
[51] Int. Cl............................................. B23b 51/00
[58] Field of Search .......... 408/199, 226, 238, 239, 408/241 R, 705; 403/309, 314, 290, 293, 292; 279/48, 47, 42; 81/177 A

[56] References Cited
UNITED STATES PATENTS

| | | | |
|---|---|---|---|
| 1,463,084 | 7/1923 | Hudson | 403/290 |
| 2,639,931 | 5/1953 | Kandle | 403/292 |
| 2,752,965 | 7/1956 | Mackey | 408/226 X |
| 3,156,478 | 11/1964 | Lamusga | 279/42 |
| 3,380,097 | 4/1968 | Pharris | 279/48 X |

Primary Examiner—Gil Weidenfeld

[57] ABSTRACT

An extension for use with a driving unit such as an electric drill comprising: a driven tool such as a drill bit having a shank; a tool holder secured to the shank and having a second shank; an elongated hollow tube; means securing the second shank to one end of the tube; a third shank; and means securing the third shank to the other end of the tube, the third shank being adapted to be disposed and held in a chuck of the driving unit.

1 Claim, 2 Drawing Figures

PATENTED FEB 11 1975　　3,865,502

TOOL EXTENSION

SUMMARY OF THE INVENTION

My invention is directed toward an extension for use with a driving unit such as an electric drill whereby elongated channels can be drilled in walls and the like, for example, to receive wiring without having to open holes in walls or the like as required when bits of conventional length are used without extension. Holes can also be drilled into a ceiling without use of a ladder, pipes cleaned out using a mounted wire brush and many other applications.

To this end, the shank of the bit or other tool is held by a tool holder having a second shank. The second shank is disposed in and is secured to one end of a hollow elongated tube. A third shank is secured to and is disposed in the other end of the tube. This shank is secured to a chuck of the driving unit. The overall distance between chuck and tool can thus be varied as desired by using longer tubes or interconnecting lengths of tubes end to end as required.

DETAILED DESCRIPTION OF PREFERRED EMBODIMENTS

Figure 1:
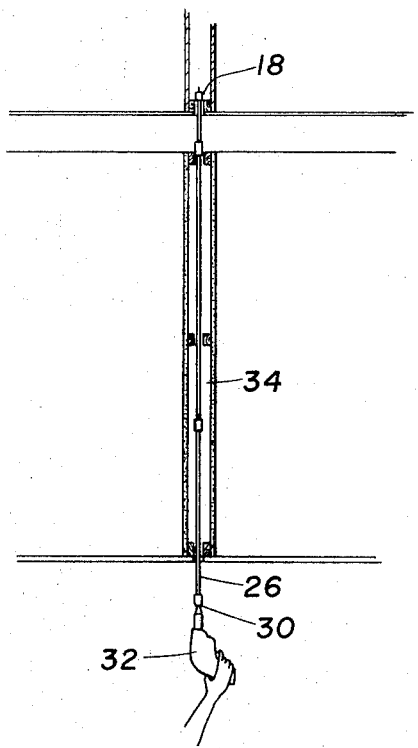
FIG.1 is a side view of my invention in use.
Figure 2:
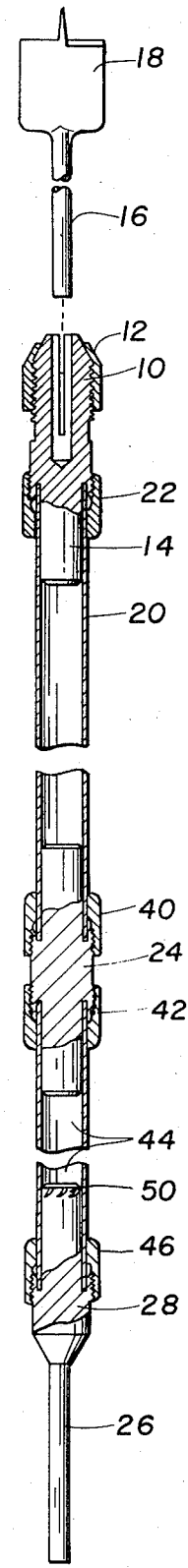
FIG. 2 is a detailed side view, partially in cross section of my invention per se.

Referring now to FIGS. 1 and 2, a tool holder has a chuck 10 with squeeze cap 12 as well as shank 14. The shank 16 of a tool such as drill bit 18 is locked into the chuck. Shank 14 is disposed in one end of vertical hollow tube 20 and hollow threaded locking ring or sleeve 22 engages threads on shank 14 and engages the end of tube 20 to lock the shank in place.

A second sleeve 40 locks the lower end of tube 20 to a coupler 24 and a third sleeve 42 locks the upper end of a like lower vertically aligned tube 44 to coupler 24.

The lower end of lower tube 44 receives an enlarged portion 28 of shank 26. Sleeve 46 engages the lower end of the tube as well as the threads on a further enlarged portion 28 of the shank.

Shank 26 can then be disposed and held in the chuck 30 of drill 32 or other driving unit whereby long vertical channels 34 can be drilled as described.

Flutes 50 perform the function of a reamer to clear the inside burrs of the tubes before assembling the extension. When pipe is cut off, there is normally a burr on the inside diameter which can make assembly difficult. To clear the burrs, attach shank 26 to a drill and ream out each piece of tube.

While I have described my invention with particular reference to the drawings, such is not to be considered as limiting its actual scope.

Having thus described this invention what is asserted as new is:

1. An extension for use with a driving unit having a chuck comprising:

a tool having a shank; a tool holder secured to the shank and having a second shank; first and second axially aligned elongated hollow tubes; each of said tubes having one end joined detachably together; a third shank having a portion adapted to be held in the chuck of the driving unit; said tool holder and said third shank having axially extending portions received within the other ends of said tubes; said tool holder and said third shank also having threaded means coaxial with said extending portions and extending therealong and overlying a portion of each of said other ends of said tubes; sleeve means having an internally tapering threaded portion; said sleeve means being received on the threaded means of said tool holder and said third shank to cooperate therewith to provide adjustable frictional engagement between said other ends of said tubes and said tool holder and said third shank, and thereby prevent undesirable rotation therebetween and provide a readily detachable connection.

* * * * *